No. 690,339. Patented Dec. 31, 1901.
A. A. WOOD.
HOLLOW AUGER.
(Application filed May 1, 1901.)
(No Model.)
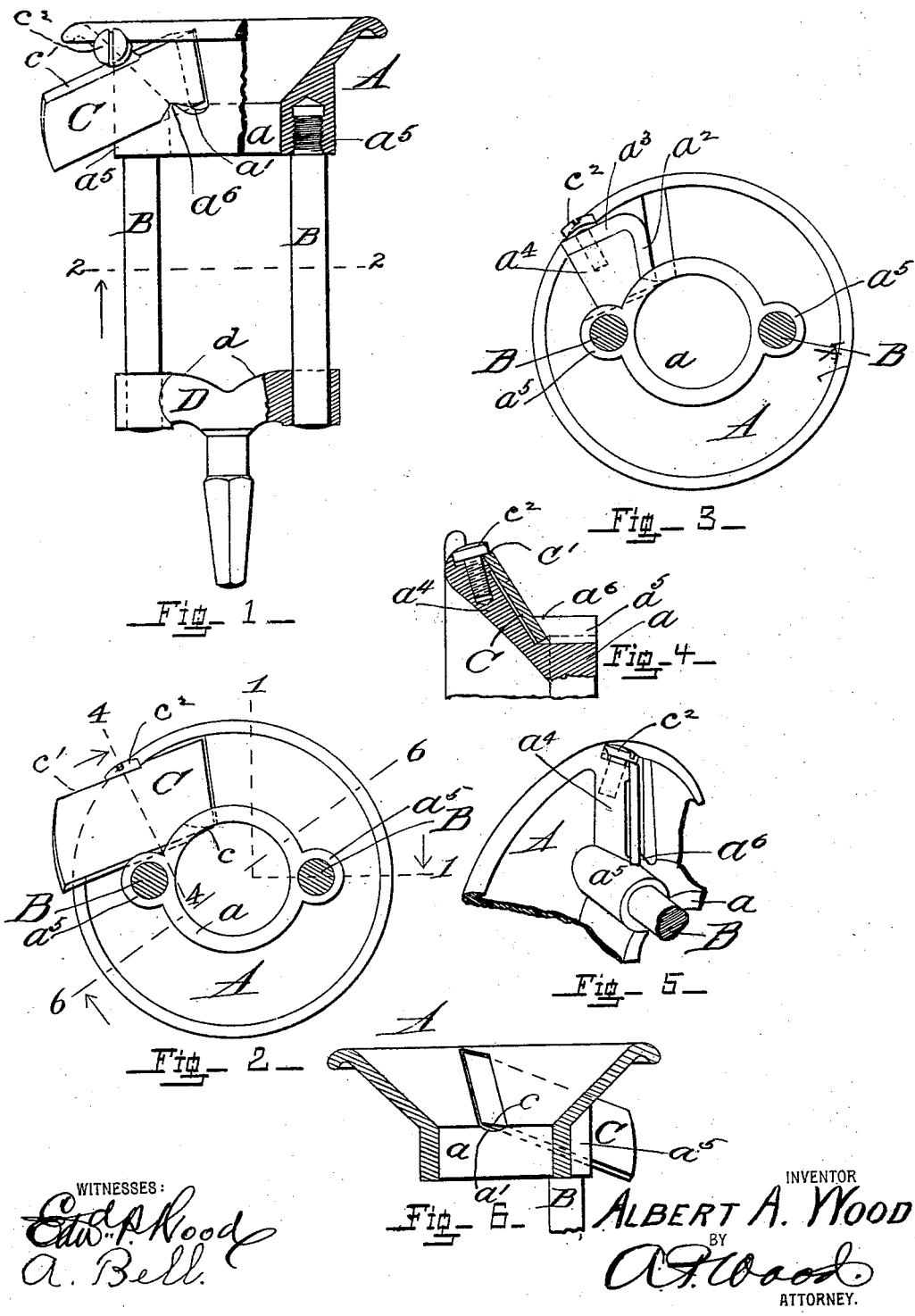
WITNESSES:
Edw. P. Wood
A. Bell.
INVENTOR
ALBERT A. WOOD
BY
A. P. Wood
ATTORNEY.

UNITED STATES PATENT OFFICE.

ALBERT A. WOOD, OF ATLANTA, GEORGIA.

HOLLOW AUGER.

SPECIFICATION forming part of Letters Patent No. 690,339, dated December 31, 1901.

Application filed May 1, 1901. Serial No. 58,309. (No model.)

*To all whom it may concern:*

Be it known that I, ALBERT A. WOOD, a citizen of the United States of America, and a resident of Atlanta, in the county of Fulton and State of Georgia, have made a certain new and useful Improvement in Hollow Augers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to hollow augers, meaning such as are employed for cutting tenons and the like, the present improvements having more particular reference to that class of such devices as are commercially known as "fore augers," the function of which is the roughening off or reducing in size of large spokes and sticks to such a size that the standard-sized auger will freely work on it to finish same and square the shoulder, fore augers usually leaving the said shoulder conical or tapering.

The present improvements consist in a novel form of head, means for rendering the auger self-feeding, a novel knife seating and locking device, and a novel manner of connecting the shank-piece and head, the details of all of which will be hereinafter fully specified.

The invention is shown in the accompanying drawings, as follows:

Figure 1 is a side view of the device, partly in section, on the line 1 1, Fig. 2. Fig. 2 is a section on the line 2 2, Fig. 1, being in the direction of the arrow X thereon. Fig. 3 is also a section on the line 2 2, Fig. 1, differing only from Fig. 2 in the removal of the knife. Fig. 4 is a section on the line 4 4, Fig. 2. Fig. 5 is a perspective view looking in the direction of the plane of the knife; and Fig. 6 is a section on the line 6 6, Fig. 2.

In the figures like reference characters are uniformly employed in the designation of corresponding elements of construction in all the views.

The head A is in the form of a hollow truncated cone with an annular flange $a$ seated on the smaller end and the larger end being preferably finished by thickening, the form shown simulating a rolled edge. Springing from the sides of the conical part of the head and joining the periphery of the annular flange are bosses $a^5$, which serve to receive the spindles B, as will be presently described. The inner sides of the cone and annular flange should be finished and reduced to an even surface, the annular flange being so finished to size, its size being the size of the tenon which the auger will cut. The flaring mouth—that is, the larger end of the conical portion—serves to center the auger on the stick to be cut, the major diameter of this conical portion being the same as the diameter of the largest stick the auger will reduce, said auger taking readily any size between these two diameters just mentioned and reducing all to the size of the bore in the annular flanged portion of the head.

The knife C consists of a flat plate of steel having one end beveled to a cutting edge and approximately one-half of one of its edges also beveled at an obtuse angle, as shown most plainly in Figs. 1, 4, and 5 at $c'$, its other edge being straight and both edges being parallel to each other. The beveled end (cutting edge) of the knife is also at an angle to the said parallel edges, so as to give it a "rake" in cutting, as will be presently explained. Now in the present invention it is desirable to so hold the knife down upon its seat that it will not chatter and to hold it so firmly against receding from its cutting position or becoming loosened by the aforesaid rake that the setting will be reliable, the duty being heavy. It is further necessary in order to carry out my novel feature of making the auger largely self-feeding that the corner $c$, Fig. 6, of the knife be so placed as to have the desired lead and be practically tangential to a circle slightly smaller than the circumference of the tenon to be cut, so as to cut and indent a screw-thread in said tenon. In these respects the existing conditions are so far concordant that I have been able to devise a simple form of knife-setting construction, which will now be described.

The opening in the head, usually known as a "knife-slot," is a slot at an angle to the radius about parallel to the raking edge of the knife when in position, said slot extending from near the edge of the head inwardly and terminating in a cut-away portion of the annular flange at $a'$, Fig. 6, (also shown near the inner corner of the knife in Fig. 1, which shows in addition the flare of this cut-away portion for chip clearance.)

As best shown in Fig. 3, a seat for the back side of the knife is provided as follows: Along the edge of the knife-slot is a rib $a^2$, and a like rib $a^3$ extends backwardly from the outer end of said rib $a^2$ alongside the edge of the head, slanting so that its end distant from the rib $a^2$ is considerably higher, whereby the knife is held with its edge in cutting relation to the tenon or conical shoulder thereof. As best shown in Fig. 5, a thickened or elevated portion $a^4$ lies along the outer surface of the head about parallel to the rib $a^2$ and takes the clamping-screw $c^2$, the under side of the head of which bears against the beveled edge $c'$ of the knife when in place. The end of the thickened portion $a^4$ is counterbored to fit the head of the screw $c^2$, so that the said head bears its under side against the beveled edge of the knife and its peripheral surface in operative opposition thereto (in resisting a part of the holding strain of the screw) upon the said counterbored wall. This is shown plainly in Fig. 4. By this means the working strain on the screw-body is confined to an axial direction.

By referring to Figs. 1 and 4 an adequate idea of the proper angle for the knife will be obtained. The tops of the ribs $a^2$ and $a^3$ are milled to the same plane, and at the same time the edge of the milling-cutter cuts into the periphery of the annular flange $a$, forming a three-sided recess, and into the contiguous boss $a^5$, forming a V-shaped recess, (merely the corner of the cutter being permitted to cut same,) which forms a seat for the inner edge of the knife—that is, the edge opposite the bevel $c'$. These two bearing-points for the knife and bearing-point on the knife of the screw $c^2$ triangulate, so that any edgewise strain on the knife tends to tighten it in its seat and prevent it from slipping away from its work. As best shown in Figs. 1 and 4, the overhanging portion of the flange $a$, above the cut therein, also limits the upward movement of the knife, so that being directly above the upper side of the rib $a^2$ that edge of the knife may not spring away from its work or spring from its seat on the said rib $a^2$, while the screw $c^2$, bearing inwardly and downwardly on said knife, presses same down, even to the extent of springing a knife down, which was sprung in tempering, upon the face of the rib $a^3$ and, acting in conjunction with the V-shaped bearing in the boss $a^5$, acts to press the cutting end of the knife downwardly on that edge against the other rib $a^2$. As seen in Fig. 2, the knife only bears its back side and back edge in the said V-shaped notch, whereby its face or front side is left free to be slightly raised, which permits a knife which was sprung in tempering in a direction to concave its front side to have its cutting end pressed downwardly to a seat, its back end then standing, relatively to the position of a straight knife, a little above the back bearing-face of the said V-shaped notch, but still bearing its edge therein against the other face of said notch, thus continuing the three-bearing system against edgewise play of the knife. A knife with its face longitudinally convex or a straight knife will obviously have a proper bearing near its cutting edge against the knife-seat, such a bearing being necessary to prevent chattering of the knife and the resultant rough cut. The depth of the recess in the flange $a$ is just sufficient to so locate the knife under pressure of the screw $c^2$ that when the knife is properly set for thickness of chip the corner $c$ thereof will project beyond the inner surface of the said flange, and the angle of the said knife-corner $c$ to the plane of the knife is such that with the inner corner—that is, the inner end of the cutting edge—in the lead the said corner $c$ follows in the cut made by same, lying and following the rudimentary screw-thread or spiral groove cut in the tenon by the knife as the auger advances, this engagement of said corner $c$ (possessing its lead) with the said spiral groove acting as a screw and nut to lead the auger on with a force and speed commensurate with the hardness of the wood and the thickness of the cut and so assisting the auger to perform its unusually heavy duty with comparative ease as to endwise pressure required. If the cutting-corner of the knife at one end of this corner $c$ is radially closer to the center of the cylindrical inner surface of the said annular flange $a$ than the heel or back end of the said corner $c$, the auger will be fed ahead, but with less certainty, while if the heel of the corner is nearer the said center the feeding will be more positive, due to the indenting action of said heel along the bottom of the previously-cut spiral groove. Variations in this respect may be accomplished by altering the angle of the bevel between practical limits.

The shank-piece D consists of a shank capable of being "chucked" in a machine or bit-brace chuck and provided with arms $d$, (there being two in the form shown.) The spindles B are screwed into the bosses $a^5$ with a right-hand thread, being reduced to form a shoulder or of a length to bottom in the holes, the former being the most practicable, and screw-threaded and should be screwed in, in assembling, with a force equal to the maximum working strain, so that a greater strain will never normally be applied. The ends of the arms $d$ are drilled about two thousandths of an inch smaller in diameter than the spindles, and the said spindles are forced in by heavy pressure and thereby form a very firm and rigid connection with the said shank-arms, such as is necessary in a driven connection. Now as the auger is turned to the right in operation and the spindle screw-threads are right-handed it is obvious that the springing of and the torsional effect thereof on the spindles under working strain will be resisted by the shoulder, and the loosening of the screw-threaded ends in their places will be prevented. Thus, inasmuch as all force during operation acts to screw the spindles in, it is obvious that there is no movement of the screw-threaded ends of the spindles to unscrew them, and consequently no wear thereon to otherwise loosen them in their seats. Were the auger constructed to be turned left-handed, correspondingly left-handed screw-threads would be required. Upon a rotation of the shank and a revolution of its arms in a right-handed direction there is a correlative rotation of the spindles, as on a swinging center, which by the springing of the said spindles under working strain caused by the resistance of the cut tends to turn the spindles in their seats in the head, this tendency in the construction described being toward a tightening of the spindles in said seats, whereas were the screw-threads of the character opposite that described this tendency would unscrew one or both of them.

Having thus described my invention, what I claim as new, and desire to secure by Letters Patent of the United States, is—

1. In a hollow auger, a conical head having an aperture at its apex and terminating, around said aperture, in an annular flange, bosses lying along said annular flange, spindles set therein, a shank secured to said spindles and a cutting-knife in operative relation to said head.

2. In a hollow auger, a conical head having an annular flange on its smaller end and a corresponding conical and cylindrical opening in said head, means for holding and driving said head, said head being slotted in its conical portion and having a raised knife-seat near said slot, a groove in said cylindrical portion in the same plane as said knife-seat whereby an overhanging lip is provided, a knife adapted to lie on said seat with its edge in said groove under said lip and project its cutting end through said slot and means for holding same in position.

3. In a hollow auger, a conical head having an annular flange on its smaller end and a corresponding conical and cylindrical opening in said head, means for holding and driving said head, said head being slotted in its conical portion and having a raised knife-seat near said slot, a groove in said cylindrical portion in the same plane as said knife-seat whereby an overhanging lip is provided, a knife adapted to lie on said seat with its edge in said groove under said lip and project its cutting end through said slot and means for holding same in position consisting of a screw set in the side of said raised seat and bearing on the outer edge of said knife.

4. In a hollow auger, a conical head having an annular flange on its smaller end and a corresponding conical and cylindrical opening in said head, means for holding and driving said head, said head being slotted in its conical portion and having a raised knife-seat near said slot, a groove in said cylindrical portion in the same plane as said knife-seat whereby an overhanging lip is provided, a knife having a portion of its edge beveled and adapted to lie on said seat with its inner edge in said groove under said lip and project its cutting end through said slot and means for holding same in position consisting of a screw set in the side of said raised seat at a downward angle thereto and adapted to bear its head on the said beveled edge of said knife.

5. In a hollow auger, a conical head having an annular flange on its smaller end and a corresponding conical and cylindrical opening in said head, means for holding and driving said head, said head being slotted in its conical portion and having a raised knife-seat near said slot, a groove in said cylindrical portion in the same plane as said knife-seat whereby an overhanging lip is provided, a knife having a portion of its edge beveled and adapted to lie on said seat with its edge in said groove under said lip and project its cutting end through said slot and means for holding same in position consisting of a screw set in the side of said raised seat at a downward angle thereto and adapted to bear its head on the said beveled edge of said knife, and the side of said raised seat being counterbored to form a cylindrical bearing for the correlatively-formed head of the said screw.

6. In a hollow auger, a conical head having an annular flange on its smaller end and a corresponding conical and cylindrical opening, bosses on the sides of said annular flange substantially parallel thereto axially, spindles and a shank-piece, said head being slotted for the knife and a raised seat for said knife formed near said slot, a recess forming an overhanging lip in the periphery of the flange slightly above said knife-seat and a notch cut in the contiguous boss and adapted together with said lip to engage the inner edge of the knife, and a screw set in the side of the said knife-seat and adapted to bear on the outer edge of said knife and press its inner edge into said notch and recess.

7. In a hollow auger, a head having a conical opening terminating near its top and continued in cylindrical form, means for holding and driving said head, said head being slotted and provided with a knife-seat near said slot, a knife adapted to seat thereon and project through said slot, said knife-seat being so constructed as to project the corner of the knife between the bevel and the inner edge thereof beyond the cylindrical surface of the aforesaid opening.

8. In a hollow auger, a head having a cylindrical recess therein, a bevel-ended knife and a seat therefor on said head adapted to hold the same at such an angle to the axis of the said cylindrical opening as to present, and project beyond the cylindrical surface, the corner between the said bevel and the inner edge of the knife and means for holding said knife on said seat.

9. In a hollow auger, a head having a cutting-knife and shank provided with arms, said head having screw-threaded holes therein and said shank having correlative holes in its arms, and spindles screw-threaded on one end and their other ends adapted to be forced into the holes in the said shank-arms, said screw-threads on the end of each of said spindles and in said head being in the same direction as the head turns in operation whereby the flexure and consequent slight rotation of said spindles during operation tend to keep same tightly screwed into said head.

In testimony whereof I hereunto affix my signature in presence of two witnesses.

ALBERT A. WOOD.

Witnesses:
A. P. WOOD,
EDWD. P. WOOD.